(12) United States Patent
Borchardt et al.

(10) Patent No.: US 12,244,190 B2
(45) Date of Patent: Mar. 4, 2025

(54) ROTOR WITH INTERCONNECTABLE COILS UNITS, ELECTRIC DRIVE MACHINE AND MOTOR VEHICLE

(71) Applicant: Bayerische Motoren Werke Aktiengesellschaft, Munich (DE)

(72) Inventors: Norman Borchardt, Luebeck (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 17/983,979

(22) Filed: Nov. 9, 2022

(65) Prior Publication Data
US 2023/0147001 A1    May 11, 2023

(30) Foreign Application Priority Data

Nov. 10, 2021  (DE) ...................... 10 2021 129 198.4

(51) Int. Cl.
| | |
|---|---|
| *H02K 19/32* | (2006.01) |
| *H02K 1/26* | (2006.01) |
| *H02K 3/18* | (2006.01) |
| *H02K 11/30* | (2016.01) |

(52) U.S. Cl.
CPC ............. *H02K 19/32* (2013.01); *H02K 1/265* (2013.01); *H02K 3/18* (2013.01); *H02K 11/30* (2016.01)

(58) Field of Classification Search
CPC .......... H02K 1/265; H02K 3/18; H02K 11/30; H02K 19/32
USPC .......................................................... 310/71
See application file for complete search history.

(56) References Cited

U.S. PATENT DOCUMENTS

| | | | | |
|---|---|---|---|---|
| 8,941,961 | B2 * | 1/2015 | Banerjee | H02H 7/06 |
| | | | | 361/87 |
| 10,608,565 | B2 * | 3/2020 | Singh | B64D 35/00 |
| 11,177,710 | B2 * | 11/2021 | Ziems | H02K 15/0037 |
| 2009/0001840 | A1 * | 1/2009 | Wolf | H02K 3/28 |
| | | | | 310/203 |
| 2018/0069465 | A1 | 3/2018 | Rezaee | |
| 2019/0267857 | A1 | 8/2019 | Bauer et al. | |
| 2020/0274430 | A1 * | 8/2020 | Petersen | H02K 1/146 |
| 2021/0091643 | A1 * | 3/2021 | Wüst | H02K 15/0062 |

(Continued)

FOREIGN PATENT DOCUMENTS

DE    10 2016 222 356 A1    5/2018

OTHER PUBLICATIONS

German-language Search Report issued in German Application No. 10 2021 129 198.4 dated Sep. 15, 2022 with partial English translation (13 pages).

*Primary Examiner* — Rashad H Johnson
(74) *Attorney, Agent, or Firm* — Crowell & Moring LLP

(57) ABSTRACT

A rotor for an electrically excited drive machine includes: a coil per rotor pole with, in each case, one first energizable coil unit, and a rotor core for holding the coils of the rotor poles. The coils have, in each case, at least one second energizable coil unit per rotor pole. The rotor has an interconnecting unit which is designed to interconnect the at least two coil units per coil in a manner which is dependent on an operating point of the electric drive machine in order to set the number of windings of the coil, and in order to electrically connect the coils of the rotor poles for configuring a rotor winding with an overall number of windings which is dependent on the numbers of windings of the coils.

17 Claims, 3 Drawing Sheets

(56) References Cited

U.S. PATENT DOCUMENTS

2022/0085676 A1  3/2022  Rolston et al.
2023/0063773 A1* 3/2023  Gerngroß ............... H02K 3/522

* cited by examiner

ROTOR WITH INTERCONNECTABLE COILS UNITS, ELECTRIC DRIVE MACHINE AND MOTOR VEHICLE

CROSS REFERENCE TO RELATED APPLICATION

This application claims priority under 35 U.S.C. § 119 from German Patent Application No. DE 10 2021 129 198.4, filed Nov. 10, 2021, the entire disclosure of which is herein expressly incorporated by reference.

BACKGROUND AND SUMMARY

The invention relates to a rotor for an electrically excited drive machine, comprising a coil per rotor pole with in each case one first energizable coil unit, and a rotor core for holding the coils. Moreover, the invention relates to an electric drive machine and to a motor vehicle.

In the present case, interest is directed at electric drive machines for electrified motor vehicles, that is to say electric or hybrid vehicles. Electric drive machines of this type can be configured as electrically excited drive machines without permanent magnets for reasons for sustainability, which drive machines have a stationary stator with an energizable stator winding, and a rotor which is mounted rotatably with regard to the stator and has an energizable rotor winding. The rotor usually has a rotor core with a number of pole shanks which correspond to the number of rotor poles and of which in each case one pole shank holds one rotor coil. Here, a number of windings of the rotor winding which is formed by the rotor coils is designed in such a way that the electric drive machine provides the necessary torque and the necessary power output for each operating point of the motor vehicle. Losses of the electric drive machine are dependent, inter alia, on the electric resistance, however, with the result that the electric drive machine does not have the highest degree of efficiency at every operating point.

It is an object of the present invention to improve an electrically excited drive machine for a motor vehicle with regard to its efficiency.

According to the invention, this object is achieved by a rotor, an electric drive machine and a motor vehicle with the features according to the respective independent patent claims. Advantageous embodiments of the invention are the subject matter of dependent patent claims, the description and the figures.

A rotor according to the invention for an electrically excited drive machine comprises a coil per rotor pole with in each case one first energizable coil unit. Moreover, the rotor comprises a rotor core for holding the coils of the rotor poles. The coil comprises in each case at least one second energizable coil unit per rotor pole. Moreover, the rotor has an interconnecting unit which is designed to interconnect the at least two coil units per coil in a manner which is dependent on an operating point of the electric drive machine in order to vary the number of windings of the coils. Moreover, the interconnecting device is designed to electrically connect the coils of the rotor poles for the configuration of a rotor winding with an overall number of windings which is dependent on the numbers of windings of the coils.

Moreover, the invention includes an electrically excited drive machine with a stator and a rotor according to the invention which is mounted rotatably with regard to the stator. The electric drive machine is, in particular, an electrically excited synchronous machine (ESM) which has the rotor as an internal rotor which is mounted rotatably within the stator.

The rotor core of the rotor can be configured, for example, as a laminated core consisting of axially stacked and mechanically connected electric laminations. The rotor core has pole shanks or pole teeth which are spaced apart along the circumferential direction, run through a pole center of the respective rotor pole, and project radially from a rotor yoke. The pole shanks configure coil bodies which support in each case at least two coil units which can be interconnected to one another. Pole shoes for holding or supporting the coil units can be arranged radially adjacently with respect to the pole shanks, with the result that the rotor poles are configured as salient poles. Pole gaps in the form of axially continuous openings adjoin the flanks of the pole shanks on both sides along the circumferential direction, and extend in the direction of pole edges of the respective rotor pole which lie opposite one another along the circumferential direction. Axial coil conductor portions of the coil units are arranged in these pole gaps. End-side coil conductor portions of the coil units are guided over axially opposite end sides of the rotor core with the configuration of winding heads. Here, the at least two coil units of a coil are arranged on the associated pole shanks so as to lie radially next to one another, in particular. Here, for example, the first coil unit is an inner coil unit which is close to the rotor yoke, and the at least one second unit is an outer core unit which is close to the outer circumference. Each energizable coil unit has a predefined number of layers and windings per layer here.

These coil units can be interconnected in a manner which is dependent on the operating point, in particular in series, that is to say can be electrically connected or disconnected in a manner which is dependent on the operating point. The interconnecting device is provided to this end. For this purpose, the interconnecting device has, in particular, switching units with in each case one electronic, controllable switch, for example a semiconductor switch. Here, per rotor pole, a coil can be formed with a first number of windings which surrounds only the first coil unit, and a coil can be formed with a second number of windings which surrounds the interconnected coil units. Here, the first number of windings is smaller than the second number of windings. A coil can optionally also be formed with a third length which lies between the first and the second length and surrounds only the second coil unit. Moreover, the interconnecting device is additionally designed to electrically connect the coils of the rotor poles in order to configure a rotor winding with a variable overall number of windings. Here, the rotor winding can be formed with a first overall number of windings by way of the interconnection of the coils which are formed from the first coil units, and can be formed with a second overall number of windings by the interconnection of the coils which are formed from the connected first and second coil units of the rotor poles. Here, the first overall number of windings is lower than the second overall number of windings.

Here, the rotor winding with the first overall number of windings which leads to lower losses in the rotor can always be provided when the current operating point of the motor vehicle does not require a rotor winding with the second overall number of windings. Operating points of this type are, in particular, weak-load operating points of the motor vehicle which require, for example, a torque and a power output of the drive machine which lie below a predefined threshold value. The interconnecting device then disconnects the first and second coil units. In contrast, the rotor winding with the second overall number of windings is provided in the case of high-load operating point, for example if the operating point-specific torque and power output requested from the drive machine lie above the predefined threshold value. The interconnecting device then interconnects the first and second coil units of a rotor pole.

By way of the adaptation of the numbers of windings of the coils and therefore the number of windings of the rotor winding to the operating point of the motor vehicle, the drive machine can advantageously be designed in an improved manner with regard to its efficiency, in particular the hysteresis losses.

It can be provided here that the coil units in each case have a feed line and a return line which are connected to the interconnecting device and of which, in a manner which is dependent on an interconnection state, provided by the interconnecting device, of the coil units, one of the feed lines configures an input connector and one of the return lines configures an output connector of the respective coil. The first coil units therefore in each case have a first feed line and a first return line, and the second coil units in each case have a second feed line and a second return line. The first and second feed lines and the first and second return lines are connected to the interconnecting device. The interconnecting device has, in particular, first switching units which are designed to connect the feed line of the one coil unit of the coil to the return line of the other coil unit of the same coil in order to interconnect the at least two coil units per coil. The respective other feed line configures the input connector of the coil, and the respective other feed line configures the output connector of the coil.

Moreover, the interconnecting device has, in particular, second switching units which are designed, in order to interconnect the coils to form the rotor winding, to electrically connect all apart from one output connector and all apart from one input connector, the unconnected input connector and the unconnected output connector configuring an overall input connector and an overall output connector of the rotor winding.

In the case, for example at weak-load operating points, where the interconnecting device does not connect the at least two coil units per rotor pole and the rotor winding is configured as the series connection of the first coil units, the respective first feed lines configure the input connectors of the coils, and the first return lines configure the output connectors of the coils. In the case, for example at high-load operating points, where the interconnecting device interconnects the at least two coil units per rotor pole and the rotor winding is configured as the series connection of the interconnected first and second coil units, the respective first feed lines configure the input connectors of the coils, and the respective second return lines configure the output connectors of the coils. In order to interconnect the coils, in each case one output connector of a coil is connected to the input connector of an adjacent coil to form the series connection by the interconnecting device. The input connector of the first coil in the series connection and the output connector of the last coil in the series connection configure the overall input connector and the overall output connector.

The overall input connector and the overall output connector can be connected to a current source in order to energize the rotor winding. To this end, the rotor can have a contact ring module which is electrically connected to the overall input connector and the overall output connector in order to energize the rotor winding. The switching units of the interconnecting device can also be switched via the contact ring module, by control lines for the switching units being integrated into the contact ring module.

In one preferred development of the invention, the coil units are configured as shaped rod coil units. Shaped rod coil units of this type comprise winding conductors in the form of shaped rods which are configured as solid conductors, for example made from copper, with an arbitrary (in particular, rectangular) conductor cross section. In particular, per rotor pole, the shaped rod coil units have in each case two packs with longitudinal shaped rods which are arranged in pole gaps which adjoin the pole shanks in order to configure axial coil conductor portions of the coil units, and in each case two packs with transverse shaped rods which are arranged on axially opposite end sides of the rotor core in order to configure end-side coil conductor portions, and are connected to the longitudinal shaped rods. The first shaped rod coil unit therefore has packs with first longitudinal shaped rods and first transverse shaped rods, and the second shaped rod coil unit has packs with second longitudinal shaped rods and second transverse shaped rods. Here, the first and the second longitudinal shaped rods can be plugged axially into the pole gaps. As a result of the plug-in option, an outer side of the rotor core can be of closed configuration, that is to say without passages for wires which can be wound. To this end, for example, pole shoes can adjoin the pole shanks, which pole shoes configure a homogeneous or inhomogeneous air gap between the rotor and the stator, and, with the configuration of pole gaps in the form of axial through openings, can be connected via connecting webs. As a result of the closed outer contour, the rotor has a high mechanical stability.

The longitudinal shaped rods can be configured here as I-shaped pins or as U-shaped pins. In the case of I-shaped pins, the longitudinal shaped rods project axially on the two end sides of the rotor core and, in the case of U-shaped rods, the longitudinal shaped rods project axially only on one end side. As a result of the U-shaped configuration, the longitudinal shaped rods of a coil unit which are arranged in the different pole gaps are already connected electrically and mechanically on an end side of the rotor core. The projecting longitudinal shaped rod ends can be connected to the transverse shaped rods, for example can be welded edge to edge. For example, the projecting longitudinal shaped rod ends can configure a plurality of contacting planes which rise in a stair-like manner from the respective tooth flank of the pole shank in opposite directions along the circumferential direction, in order to contact longitudinal shaped rods of different winding layers. The transverse shaped rods which are required to complete a coil layer can be integrated into respective winding layer-specific cross-connectors which are successively stacked axially on the at least one end side. To this end, the cross-connectors can in each case have a holding structure with radially projecting holding frames which are arranged so as to overlap with the pole shanks and which in each case hold a pack with first, winding layer-specific transverse shaped rods and a pack with second, coil layer-specific transfer shaped rods. The holding frames can be arranged, for example, on a respective yoke of the holding structures, which yoke can be connected fixedly to a rotor shaft of the rotor for conjoint rotation.

In one embodiment of the invention, the interconnecting device has a housing which is connected to the rotor shaft of the rotor, in which housing the switching units for interconnecting the coil units and the windings are arranged, and has, furthermore, four connector shaped rods per winding, which connector shaped rods are arranged in regions in the housing and are connected to the switching units, and are arranged in regions outside the housing and, in order to configure the feed lines and the return lines, are connected to respective coil starts and coil ends of the shaped rod coil units. Depending on the interconnecting state of the coil units, two of the connector shaped rods configure the respective input connector and the respective output connector of the coil. For example, the housing can be of annular disk-shaped configuration, the connector shaped rods protruding radially out of the housing shell of the housing. The annular disk-shaped housing can enclose, for example, a contact ring of the contact ring module, with the result that the overall connectors of the rotor winding which are formed by two of the connector shaped rods are connected to the contact ring module in order to energize the rotor winding.

Other coil manufacturing techniques are also possible for configuring the coil units, however. For example, the coil units can also be configured as wound wire coil units which are formed from a wire which is wound around the pole shanks.

Moreover, the invention includes an electrified motor vehicle with at least one electric drive machine according to the invention.

The embodiments proposed with reference to the rotor according to the invention and their advantages apply mutatis mutandis to the electric drive machine according to the invention into the motor vehicle according to the invention.

Further features of the invention result from the claims, the figures and the description of the figures. The features and combinations of features mentioned above in the description and the features and combinations of features mentioned in the following text in the description of the figures and/or shown solely in the figures can be used not only in the respective specified combination, but rather also in other combinations or on their own.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical and functionally identical elements are provided with the same reference numerals.

DETAILED DESCRIPTION OF THE DRAWINGS

Figure 1:
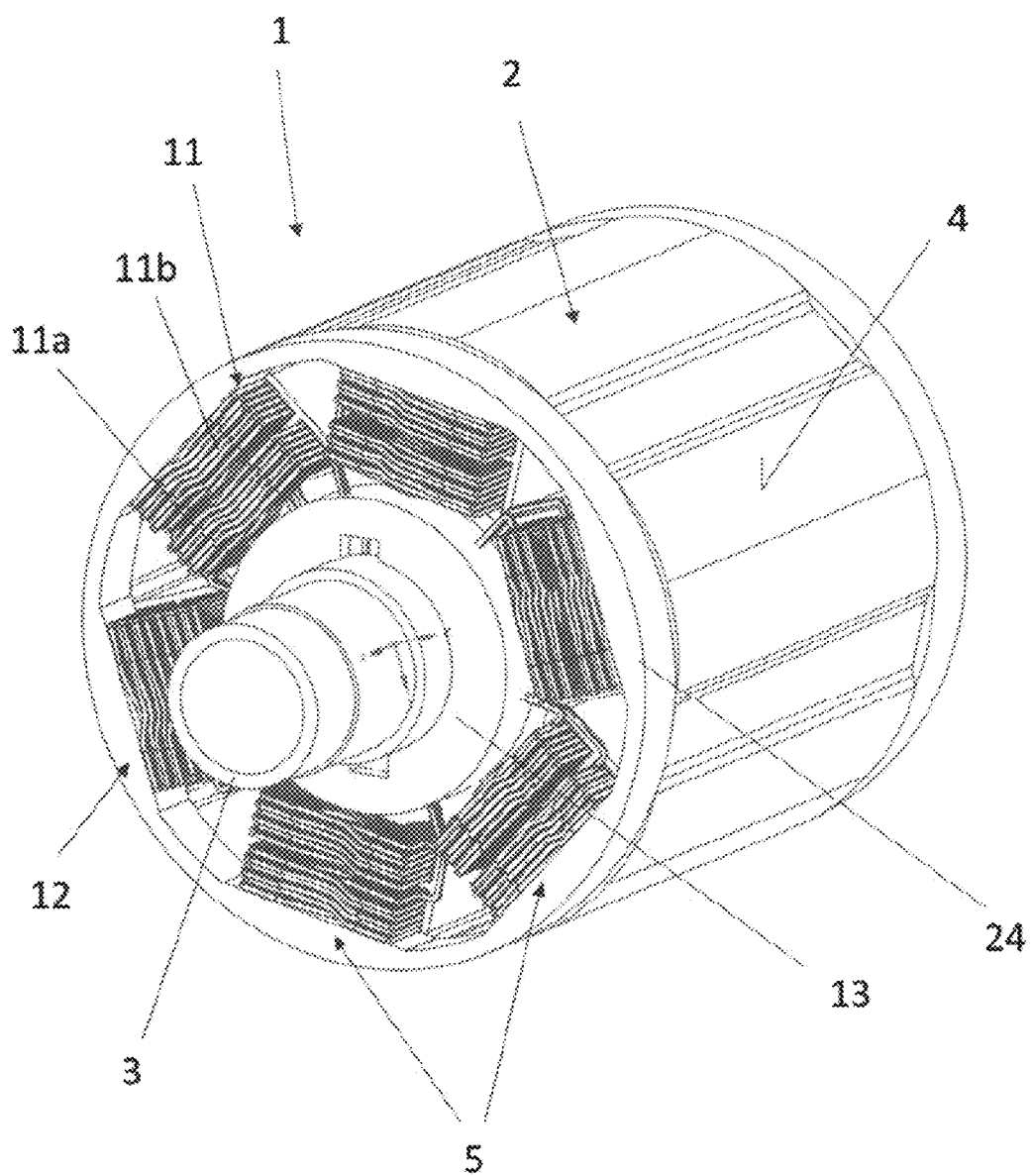
FIG. 1 is a diagrammatic perspective illustration of a rotor of an electric drive machine.

FIG. 1 shows a rotor 1 for an electrically excited drive machine of an electrified motor vehicle. The rotor 1 has a rotor core 2 which can be formed as a laminated core consisting of axially stacked electric laminations. Moreover, the rotor 1 has a rotor shaft 3 which is connected fixedly to the rotor core 2 for conjoint rotation, for the transmission of torque. Here, the rotor core 2 has a solid pole geometry which is formed by a closed outer side 4, gapless in the circumferential direction, of the rotor core 2 and therefore of the entire rotor 1. This closed outer side 4 minimizes the air friction losses and increases the mechanical stability of the rotor 1.

Figure 2:
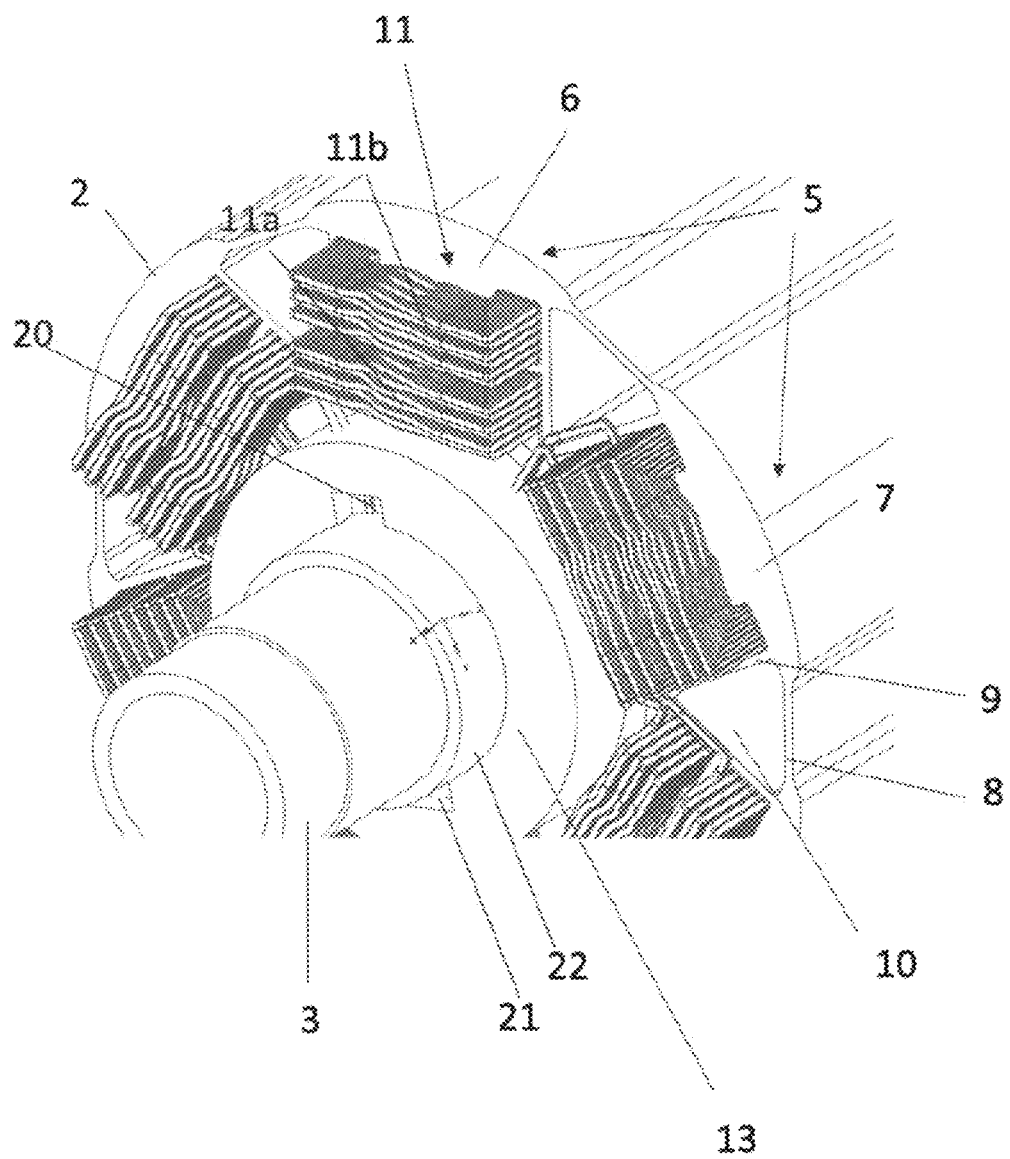
FIG. 2 is a diagrammatic perspective illustration of a detail of the rotor.

Here, the rotor core 2 has six rotor poles 5 which in each case have a pole shank 6, as can be seen in FIG. 2. Here, the respective pole shanks 6 are of salient pole-shaped configuration and extend through a pole center of the respective rotor pole 5. Pole shoe-shaped regions 7 of the salient pole-shaped pole shanks 6 are connected here via connecting webs 8 which are configured in one piece with the regions 7, with the result that the closed, gapless outer side 4 is configured. Pole gaps are configured adjacently to opposite flanks (along the circumferential direction) of the pole shanks 6, which pole gaps extend in the direction of pole edges of the rotor poles 5. Here, the pole gaps are delimited in the direction of the pole edges by supporting web arrangements 9, in each case one supporting web arrangement 9 being arranged between the pole gaps of two adjacent rotor poles 5. Here, the supporting web arrangements 9 are of V-shaped configuration, with the result that respective cavities 10 which reduce weight and flux leakage are configured in the rotor core 2 between the supporting web arrangements 9 and the connecting webs 8.

The pole shanks 6 in each case hold a winding 11 which has two coil units 11a, 11b here. The coils 11 are interconnected to form a rotor winding 12. Here, the coil units 11a, 11b of a rotor pole 5 can be interconnected in different ways, for example in series, in a manner which is dependent on the operating point of the electric drive machine. For example, the rotor winding 12 therefore has only the interconnected first coil units 11a or the interconnection consisting of first and second coil units 11a, 11b. As a result of the possibility of it being possible for the second coil units 11b to be connected in, the rotor winding 12 has an adjustable number of windings which in turn influences loss of the electric drive machine. For operating point-dependent interconnecting of the coil units 11a, 11b and for connecting the windings 11 to the rotor winding 12, the rotor 1 has an interconnecting device 13. The interconnecting device 13 is connected to the rotor shaft 3 here.

Figure 3:
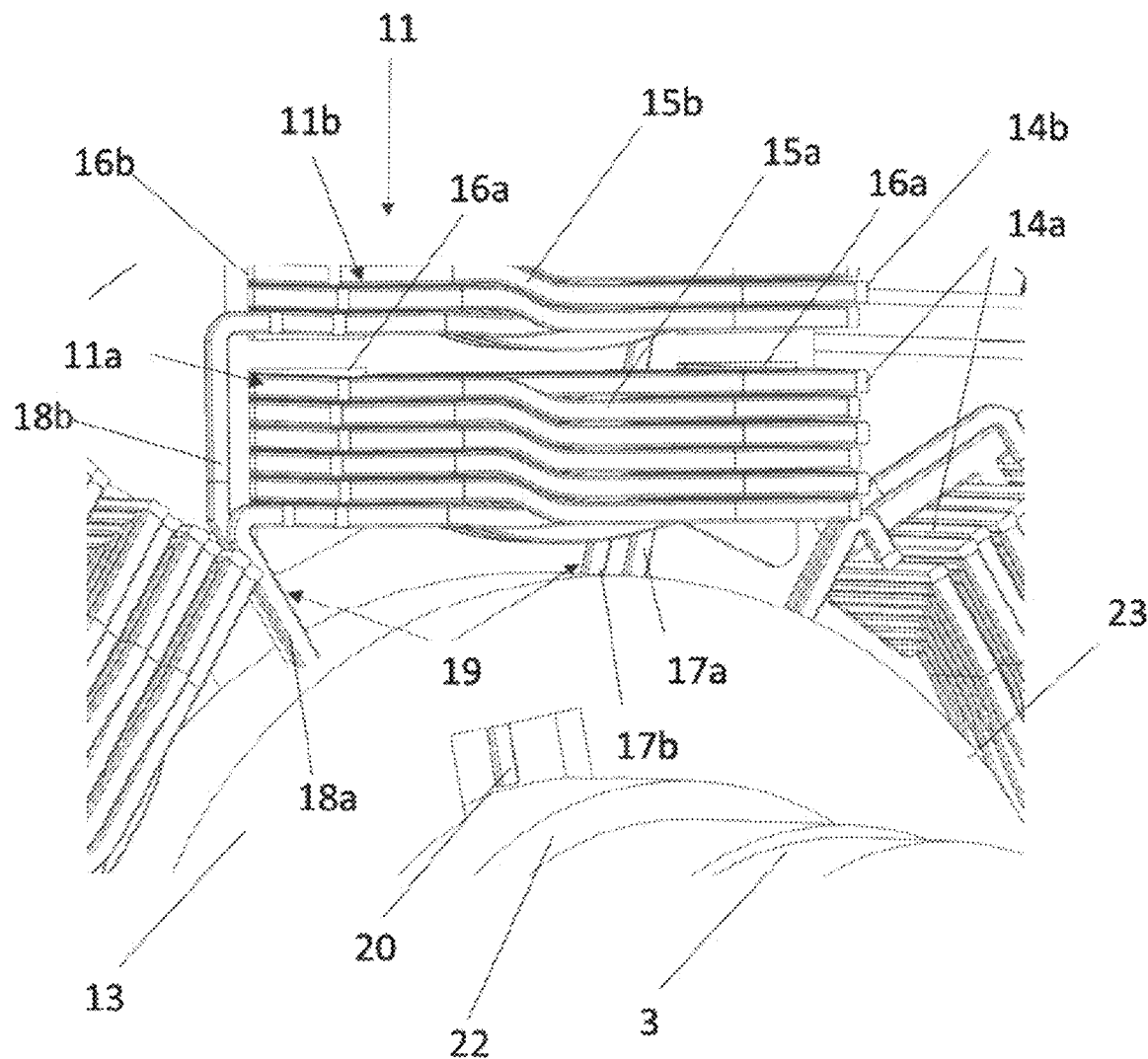
FIG. 3 is a diagrammatic perspective illustration of an enlarged detail of the rotor.

FIG. 3 shows the two coil units 11a, 11b of a rotor pole 5 in an enlarged illustration. The coil units 11a, 11b are configured as shaped rod coil units with longitudinal shaped rods 14a, 14b and transverse shaped rods 15a, 15b. Here, the longitudinal shaped rods 14a which correspond to the first winding unit 11a are plugged axially into first pole gaps 16a, and the longitudinal shaped rods 14b which correspond to the second winding unit 11b are plugged axially here into second pole gaps 16b. The first longitudinal shaped rods 14a are connected via first transverse shaped rods 15a, and the second longitudinal shaped rods 14b are connected via second transverse shaped rods 15b. The longitudinal shaped rods 14a, 14b and the transverse shaped rods 15a, 15b are welded, in particular.

Moreover, the coil units 11a, 11b have feed lines 17a, 17b and return lines 18a, 18b which are configured here by connector shaped rods 19. In the case of non-interconnected coil units 11a, 11b, the respective first feed lines 17a and the first return lines 18a and, in the case of interconnected coil units 11a, 11b, the respective first feed lines 17a and the second return lines 18b form input connectors and output connectors of the respective windings 11. One of the input connectors forms an overall input connector 20 of the rotor winding 12, and one of the output connectors forms an overall output connector 21 of the rotor winding 12. The overall input connector 20 and the overall output connector 21 are connected to a contact ring 22 of a contact ring module of the rotor 1, which contact ring 22 is connected to the rotor shaft 3.

The connector shaped rods 19 are integrated into the interconnecting device 13, where they are electrically connected to switching units (not shown here) of the interconnecting device 13. Here, the interconnecting device 13 has a housing 23, in which the connector shaped rods 19 are arranged in regions. In the case of the arranging of the annular disk-shaped housing 23 on the rotor shaft 23, the connector shaped rods are arranged on the respective longitudinal shaped rods 14a, 14b, 15a, 15 which configure a winding start and a winding end of the respective winding 11a, 11b, and are connected to them, for example welded. Moreover, winding heads of the rotor winding 12 which are formed by the transverse shaped rods 15a, 15b are encapsulated by a supporting ring 24 in order to absorb centrifugal forces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for an electrically excited drive machine, comprising:
    a coil per rotor pole with, in each case, one first energizable coil unit; and
    a rotor core for holding the coils of the rotor poles, wherein
        the coils have, in each case, at least one second energizable coil unit per rotor pole, and
        the rotor has an interconnecting unit configured to interconnect the first and second coil units per coil in a manner which is dependent on an operating point of the electric drive machine in order to set the number of windings of the coil, and in order to electrically connect the coils of the rotor poles for configuring a rotor winding with an overall number of windings which is dependent on the numbers of windings of the coils,
    wherein the coil units in each case have a feed line and a return line which are connected to the interconnecting unit, and of which, in a manner dependent on an interconnection state, provided by the interconnecting unit, of the coil units, one of the feed lines configures an input connector and one of the return lines configures an output connector of the respective coil,
    wherein the interconnecting unit is configured to:
        in order to interconnect the first and second coil units per coil, connect the feed line of the one coil unit of the coil to the return line of the other coil unit of the same coil, the respective other feed line configuring the input connector of the coil, and the respective other return line configuring the output connector of the coil; and
        in order to interconnect the coils, electrically connect all apart from one output connector and all apart from one input connector to the rotor winding, the unconnected input connector and the unconnected output connector configuring an overall input connector and an overall output connector of the rotor winding.

2. The rotor according to claim 1, wherein the first and second coil units of a coil are arranged so as to lie radially next to one another on a pole shank of the rotor core.

3. The rotor according to claim 1, wherein the rotor comprises a contact ring module which, in order to energize the rotor winding, is electrically connected to the overall input connector and the overall output connector, and/or is connected to control lines of switching units within the interconnecting unit in order to actuate the switching units.

4. The rotor according to claim 1, wherein the first and second coil units are configured as shaped rod coil units.

5. The rotor according to claim 4, wherein the shaped rod coil units comprise, per rotor pole:
    in each case, two packs with longitudinal shaped rods which are arranged in pole gaps in order to configure axial coil conductor portions of the coil units, and
    in each case, two packs with transverse shaped rods which are arranged on the axially opposite end sides of the rotor core in order to configure end-side coil conductor portions, and are connected to the longitudinal shaped rods.

6. The rotor according to claim 1, wherein the first and second coil units are configured as shaped rod coil units.

7. The rotor according to claim 6, wherein the interconnecting unit has a housing which is connected to a rotor shaft of the rotor, and has, further, four connector shaped rods per coil, which connector shaped rods are arranged in regions within the housing and in regions outside the housing and, in order to configure the feed lines and the return lines, are connected to respective coil starts and coil ends of the shaped rod coil units.

8. The rotor according to claim 1, wherein the first and second coil units are configured as wound wire coil units.

9. An electrically excited drive machine, comprising:
    a stator; and
    a rotor according to claim 1,
    wherein the rotor is mounted rotatably with regard to the stator.

10. A motor vehicle comprising at least one electrically excited drive machine according to claim 9.

11. A rotor for an electrically excited drive machine, comprising:
    a coil per rotor pole with, in each case, one first energizable coil unit; and
    a rotor core for holding the coils of the rotor poles, wherein
        the coils have, in each case, at least one second energizable coil unit per rotor pole, and
        the rotor has an interconnecting unit configured to interconnect the first and second coil units per coil in a manner which is dependent on an operating point of the electric drive machine in order to set the number of windings of the coil, and in order to electrically connect the coils of the rotor poles for configuring a rotor winding with an overall number of windings which is dependent on the numbers of windings of the coils,
    wherein the first and second coil units are configured as shaped rod coil units, and
    wherein the shaped rod coil units comprise, per rotor pole:
        in each case, two packs with longitudinal shaped rods which are arranged in pole gaps in order to configure axial coil conductor portions of the coil units, and
        in each case, two packs with transverse shaped rods which are arranged on the axially opposite end sides of the rotor core in order to configure end-side coil conductor portions, and are connected to the longitudinal shaped rods.

12. The rotor according to claim 11, wherein
the first and second coil units of a coil are arranged so as to lie radially next to one another on a pole shank of the rotor core.

13. The rotor according to claim 11, wherein
the coil units in each case have a feed line and a return line which are connected to the interconnecting unit, and of which, in a manner dependent on an interconnection state, provided by the interconnecting unit, of the coil units, one of the feed lines configures an input connector and one of the return lines configures an output connector of the respective coil.

14. The rotor according to claim 13, wherein
the interconnecting unit is configured to, in order to interconnect the first and second coil units per coil, connect the feed line of the one coil unit of the coil to the return line of the other coil unit of the same coil, the respective other feed line configuring the input connector of the coil, and the respective other return line configuring the output connector of the coil.

15. The rotor according to claim 13, wherein
the interconnecting unit has a housing which is connected to a rotor shaft of the rotor, and has, further, four connector shaped rods per coil, which connector shaped rods are arranged in regions within the housing and in regions outside the housing and, in order to configure the feed lines and the return lines, are connected to respective coil starts and coil ends of the shaped rod coil units.

16. The rotor according to claim 11, wherein
the rotor comprises a contact ring module which, in order to energize the rotor winding, is electrically connected to the overall input connector and the overall output connector, and/or is connected to control lines of switching units within the interconnecting unit in order to actuate the switching units.

17. A rotor for an electrically excited drive machine, comprising:
a coil per rotor pole with, in each case, one first energizable coil unit; and
a rotor core for holding the coils of the rotor poles, wherein
the coils have, in each case, at least one second energizable coil unit per rotor pole, and
the rotor has an interconnecting unit configured to interconnect the first and second coil units per coil in a manner which is dependent on an operating point of the electric drive machine in order to set the number of windings of the coil, and in order to electrically connect the coils of the rotor poles for configuring a rotor winding with an overall number of windings which is dependent on the numbers of windings of the coils,
wherein the coil units in each case have a feed line and a return line which are connected to the interconnecting unit, and of which, in a manner dependent on an interconnection state, provided by the interconnecting unit, of the coil units, one of the feed lines configures an input connector and one of the return lines configures an output connector of the respective coil,
wherein the first and second coil units are configured as shaped rod coil units, and
wherein the interconnecting unit has a housing which is connected to a rotor shaft of the rotor, and has, further, four connector shaped rods per coil, which connector shaped rods are arranged in regions within the housing and in regions outside the housing and, in order to configure the feed lines and the return lines, are connected to respective coil starts and coil ends of the shaped rod coil units.

* * * * *